Patented Dec. 4, 1951

2,576,909

UNITED STATES PATENT OFFICE 2,576,909

COAGULATION OF SYNTHETIC RUBBER LATICES

James W. Adams, Seymour, Conn., assignor to United States Rubber Company, New York, N. Y., a corporation of New Jersey No Drawing. Application May 23, 1950,
Serial No. 163,790

6 Claims. (Cl. 260—85.1)

This invention relates to improvements in the coagulation of synthetic rubber latices.

Synthetic rubber latices, as is known, may be prepared by the aqueous emulsion polymerization of butadienes-1,3 or mixtures of butadienes-1,3 with other polymerizable compounds capable of forming copolymers with butadienes-1,3. In practice, the synthetic rubber-forming monomers are emulsified in water with anionic surface-active agents and the emulsion is polymerized in the presence of a conventional catalyst and regulator. The monomers, such as butadiene-1,3 and styrene in conventional GR-S latex preparation, are polymerized to the desired extent, and the reaction is stopped by addition of a polymerization inhibitor or short-stopper, after which residual unreacted monomers are removed from the latex by venting gaseous monomers and by steam distillation under reduced pressure of higher boiling monomers. The thus formed latex may be flocculated by mixing with conventional aqueous solutions of salt and/or acid coagulating agents, such as mixing with solutions of polyvalent metal salts, e. g. calcium chloride, aluminum sulfate, zinc sulfate, or solutions of acids such as sulfuric, hydrochloric, acetic or formic acid, or solutions of mixtures thereof, or solutions of mixtures of such acids with alkali salts, e. g. sodium chloride, or by mixing with separate solutions of any of the above, as in the conventional two step flocculation where the latex is first mixed with an aqueous solution of sodium chloride to thicken or "cream" the latex, and then is mixed with an aqueous solution of sulfuric acid to coagulate the latex into readily filterable rubber flocs. The amount of such flocculating agents used will vary over a wide range. Acids and polyvalent-metal salt coagulants, as known, may be used in amounts from about 1% to about 20% based on the rubber in the latex, the amount in any given case depending on the particular coagulant used and the amount of protective in the latex to be flocculated. The amount of alkali salt, when used, may be up to about 25% based on the rubber in the latex.

Where water-soluble soaps of soap-forming monocarboxylic acids, such as the alkali salts of higher fatty acids, rosin acids, or naphthenic acids are the anionic surface-active agents used to emulsify the polymerizable monomers, the latices may readily be flocculated with the various conventional salt and/or acid coagulants to give a clear serum free from uncoagulated particles or fines which would remain suspended in the filtrate and represent a loss of rubber material. In some synthetic rubber formulations or recipes, it is desirable to add an auxiliary stabilizer in order to prevent possible preflocculation in the reactor or in other steps of the process prior to the final coagulation. Such auxiliary stabilizers are other well-known anionic surface-active agents than the monocarboxylic acid soaps, and are sulfates and sulfonates of organic compounds containing at least one group having more than 8 carbon atoms. However, such auxiliary stabilizers are at best only partially deactivated by the conventional salt and/or acid coagulants for the latex and cause appreciable amounts of fines after conventional flocculation of the latex, with loss of such fines in the filtrate on separation of the rubber flocs. Further, such organic sulfate and sulfonate surface-active agents are generally used to disperse carbon black in water before mixing with synthetic rubber latex and flocculating the latex-carbon black mixture to form so-called rubber-carbon black master batches. In such cases, even larger amounts of these organic sulfate and sulfonate surface-active agents are present, causing even greater loss in fines in the filtrate from the rubber-carbon black floc separation.

The object of the present invention is to reduce as far as possible the loss in fines on flocculation of synthetic rubber latices (including compounded latices, such as latex-carbon black mixtures) containing sulfate or sulfonate surface-active dispersing agents.

In carrying out the present invention, the synthetic rubber latex, which may be compounded with carbon black, clay, or other compounding ingredients, and which contains sulfate or sulfonate surface-active agent is flocculated with conventional salt and/or acid flocculant and in addition a cationic surface-active agent containing an organic group having 10 to 20 carbon atoms, and which may be a monoamine, a diamine (including glyoxalidines), or a quaternary ammonium compound. Such amine or quaternary ammonium compounds are generally used in the form of their salts, as the hydrochlorides or acetates, and may be added to the latex before mixing with the flocculating solution, or may be added to the flocculating solution before mixing with the latex if the flocculant does not precipitate the amine or quaternary ammonium compound, or may be added to the flocculated latex bath to flocculate fines suspended therein and clarify the filtrate. Where the latex is creamed by addition of an alkali salt before flocculating, the cationic surface-active agent is preferably added after the creaming and before flocculation. Since the cationic surface-active agents used herein precipitate the sulfate or sulfonate anionic surface-active agents and destabilize latices containing carboxylate soaps, they should not be added to the latex (or latex-carbon black) system until after the latex has been removed from the reactor.

The amount of alkali soap of soap-forming monocarboxylic acid used as an emulsifying agent for the polymerizable monomers in preparing synthetic rubber latex, is generally from 3% to 6% based on the polymerizable monomers. All percentages and parts used herein are by weight. The amount of auxiliary sulfate or sulfonate surface-active dispersing agent for the polymerizable monomers used in preparing the synthetic rubber latex, may be from 0.05% to 1% based on the polymerizable monomers. The conversion of monomers to polymer will generally be about 50% to 85%. The amount of sulfate or sulfonate surface-active agent used to disperse carbon black in water prior to mixing with the latex will generally be about 1% to 5% based on the carbon black. The ratio of carbon black to rubber, when a carbon black slurry is mixed with the latex to prepare a so-called master batch, is in the range of 40 to 100 parts of carbon black per 100 parts of rubber of the latex, preferably 50 to 60 parts of carbon black per 100 parts of rubber of the latex. The content of alkali soap of soap-forming monocarboxylic acid in the latex to be flocculated will thus generally be from 3% to 10% based on the rubber of the latex. The content of sulfate or sulfonate surface-active agent in the latex will thus generally be from 0.05% based on the rubber where the latex does not contain carbon black to 6% based on the rubber where the latex is compounded with large amounts, around equal parts, of carbon black.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electronegative group, that is, a group which substantially increases the electrical dissymmetry or polar character of the molecule. Examples of such monoolefines containing a terminal methylene ($CH_2=C<$) group which are copolymerizable with butadienes-1,3, are aryl olefines, such as styrene, vinyl napthylene; alpha methyl styrene, parachloro styrene, dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride.

The water-soluble soaps of soap-forming monocarboxylic acids used as emulsifying agents for the polymerizable monomers are alkali salts of aliphatic acids having chains of 8 to 24 carbon atoms in the molecule, for example, caprylic, pelargonic, capric, lauric, palmitic, stearic, oleic acids, alkali salts of naphthenic acids, and alkali salts of rosin acids, including hydrogenated, dehydrogenated, and disproportionated rosin acids, such as alkali salts of abietic acid, dehydroabietic acid, dihydroabietic acid, tetrahydroabietic acid, and mixtures of the same. The term "alkali salts" (or soaps) is used herein in its conventional sense as including alkali-metal, ammonium, and substituted ammonium (amine) salts, but excluding alkali earth and other polyvalent metal salts.

The sulfate and sulfonate surface-active agents which may be used as auxiliary dispersing agents in the preparation of the synthetic rubber latex, and which may be used to disperse carbon black in water to mix with the latex, are those having a general formula $R—SO_3M$, where M represents alkali, that is, alkali metal, ammonium or substituted ammonium (amine) radical, and R represents an organic radical containing at least one group having more than 8 carbon atoms, and generally not more than 24 carbon atoms. Such organic group is the hydrophobic group that forms part of the anion of the surface-active agent in water. Examples of such anionic surface-active agents are:

(1) Alkyl sulfonates (e. g. dodecyl sodium sulfonate, cetyl potassium sulfonate).

(2) Alkyl sulfates (e. g. sodium dodecyl sulfate, sodium oleyl sulfate).

(3) Sulfonated ethers of long and short chain aliphatic groups (e. g.

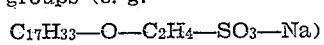

(4) Sulfated ethers of long and short chain aliphatic groups (e. g.

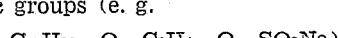

(5) Sulfonated alkyl esters of long chain fatty acids (e. g.

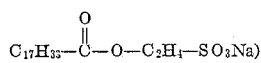

(6) Sulfonated glycol esters of long chain fatty acids (e. g.

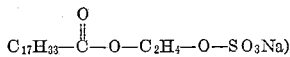

(7) Sulfonated alkyl substituted amids of long chain fatty acids e. g.

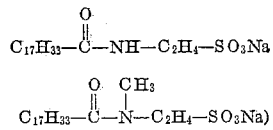

(8) Alkylated aryl sulfonates (e. g. isopropyl naphthalene sodium sulfonate, dodecyl benzene sodium sulfonate).

(9) Hydroaromatic sulfonates (e. g. tetrahydronaphthalene sodium sulfonate).

(10) Alkyl sulfosuccinates (e. g. dioctyl sodium sulfosuccinate).

(11) Aryl sulfonate-formaldehyde condensation products (e. g. condensation product of formaldehyde and sodium naphthalene sulfonate,

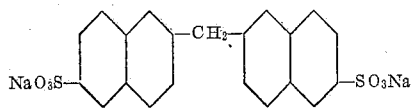

In the cation-active monoamines and diamines and quaternary ammonium compounds containing an organic group having 10 to 20 carbon atoms which will reduce the fines in the serum of a flocculated latex containing a sulfate or sulfonate surface-active agent, the organic group having 10 to 20 carbon atoms, which is the hydrophobic group that forms part of the cation of the surface-active agent in water, may be acyclic or cyclic, as in the following examples which illustrate the invention.

Example I

A synthetic rubber latex was prepared by heating with agitation for about 12 hours at about 122° F. an emulsion of 75 parts of butadiene-1,3 and 25 parts of styrene in 180 parts of water. The emulsion contained 5 parts of sodium soap of higher fatty acids (stearic, palmitic and oleic acids) as emulsifier, 0.25 part of potassium persulfate as catalyst and 0.67 part of dodecyl mercaptan as regulator. After heating 12 hours, polymerization was stopped by adding 0.08 part of hydroquinone in an aqueous solution. Unreacted butadiene was vented off and unreacted styrene was removed by steam distillation under reduced pressure. 1.5 parts of an antioxidant (condensation product of diphenylamine and acetone) was added to the latex in the form of an aqueous emulsion. The final synthetic rubber latex had a 27% solids concentration.

Several portions of a carbon black dispersion were prepared by mixing 50 parts of an easy processing channel (EPC) carbon black in 200 parts of water in the presence of 0.2 part of sodium hydroxide and 1.5 parts of the sodium salt of the condensation product of formaldehyde and naphthalene sulfonic acid as the dispersing agent under conditions of violent agitation.

Four portions of the carbon black dispersion containing 50 parts of carbon black were mixed with four portions of the GR-S latex prepared as above containing 100 parts of synthetic rubber giving a ratio of carbon black to rubber of 1 to 2. The first latex-carbon black mix was flocculated by mixing it with a flocculating bath containing 500 parts of water, 12 parts of sodium chloride and 2 parts of hydrochloric acid. After flocculation, the latex was filtered through a 54 mesh screen. The filtrate contained a large amount of suspended matter or fines which were not recovered and which amounted to a 1.11% loss. On addition to the sodium chloride-hydrochloric acid flocculating solution for the three other portions of 0.1, 0.25 and 0.5 part of "Rosin Amine D" in 2.5% acetic acid solution respectively, the loss of fines in the filtrates was 0.13%, 0.05% and 0.07% respectively. "Rosin Amine D" is a commercial mixture of dehydroabietylamine, tetrahydroabietylamine, dihydroabietylamine and dextropimarylamine. It is described by J. N. Borglin in an article appearing in "Soap and Sanitary Chemicals," December 1947. It is made from disproportionated rosin acids. Amines made from straight rosin acids, such as abietylamine, or from otherwise modified rosin acids, such as hydrogenated or dehydrogenated rosin acids, may also be used in the present invention.

Example II

The synthetic rubber latex used was prepared similarly to the latex of Example I. The carbon black dispersion used was prepared similarly to the carbon black dispersion of Example I.

A latex-carbon black mix was prepared by mixing the latex and carbon black slurry on the proportion of 100 parts rubber solids to 50 parts of carbon black in the slurry, giving 1.5 parts of the condensation product of formaldehyde with sodium naphthalene sulfonate per 100 parts of the rubber. Portions of the latex-carbon black mix were flocculated by mixing with a flocculating bath containing 500 parts of water, 12 parts of sodium chloride and 2 parts of sulfuric acid per 100 parts of rubber in the rubber-carbon black mix. Various amounts of cationic surface-active agents were added to the sodium chloride-sulfonic acid flocculating baths in some cases. The flocculated latex-carbon black mixes were filtered through a 54-mesh screen and the amount of suspended matter in the filtrates determined.

With no addition of cationic surface-active agent to the flocculated bath, the loss in the filtrate was 0.59% of the master batch. With 0.125% and 0.25% of 1-hydroxyethyl 2-heptadecenyl glyoxalidine based on the rubber content, the losses in the filtrates were 0.09% and 0.14% respectively. With 0.125% and 0.25% of 5-dodecylbenzyl trimethyl ammonium chloride based on the rubber content, the losses in the filtrates were 0.15% and 0.24% respectively.

Example III

An aqueous emulsion of butadiene-1,3 and styrene was prepared according to the following formulation:

|  | Parts |
|---|---|
| Butadiene | 71.5 |
| Styrene | 28.5 |
| Water | 215. |
| Cumene hydroperoxide | 0.12 |
| Mixed tertiary mercaptans | 0.24 |
| Potassium salt of disproportionated rosin acid | 4.0 |
| Sodium salt of condensation product of formaldehyde and naphthalene sulfonic acid | 0.1 |
| Trisodium phosphate, dodecahydrate | 0.3 |
| Ferrous sulfate, heptahydrate | 0.18 |
| Potassium pyrophosphate | 0.2 |

The above formulation is the conventional type of so-called "sugar-free" formulation for GR-S polymerizations at low temperatures (41° F.). The mixed tertiary mercaptans comprised 60% tertiary dodecyl mercaptan, 20% of tertiary tetradecyl mercaptan, and 20% of tertiary hexadecyl mercaptan, and is used as a regulator; the potassium soap of disproportionated rosin acid is the primary emulsifier; the sodium salt of the condensation product of formaldehyde and naphthalene sulfonic acid is the auxiliary surface-active dispersing agent; the trisodium phosphate is a buffer; the cumene hydroperoxide is a typical organic peroxygen type catalyst; and the sodium pyrophosphate and the ferrous sulfate are activators for the cumene hydroperoxide catalyst. Polymerization was carried out at 41° F. for about 14 hours, to 60% conversion of polymerizable monomers, after which the polymerization was stopped by adding 0.23 parts of dinitrochlorobenzene in styrene (5% solution). Unreacted butadiene was vented off and unreacted styrene was removed by steam distillation under reduced pressure. 1.5 parts of an antioxidant (condensation product of diphenylamine and acetone) was added to the latex in the form of an aqueous emulsion. The final synthetic rubber latex had a 21% solids concentration.

The latex prepared as above was flocculated by first thickening or creaming by mixing with an aqueous solution containing 12% of sodium chloride based on the rubber content of the latex followed by mixing therewith an aqueous solution containing 2% of sulfuric acid based on the rubber content of the latex. On filtering, the filtrate was cloudy, showing the presence of suspended matter or fines in the serum which were not recovered in the filtering procedure. The amount of such fines represented about 10% of the original rubber contained in the latex. Acetic acid solutions of various chemicals of the present invention were used to titrate portions of the cloudy serum until the suspended fines flocculated and gave a clear serum.

The amount of 1-hydroxyethyl 2-heptadecyl glyoxalidine to give a clear serum was 0.048% based on the rubber. The amount of 5-dodecylbenzyl trimethyl ammonium chloride to give a clear serum was 0.048% based on the latex. The amount of dodecylamine to give a clear serum was 0.030% based on the latex. The amount of "Rosin Amine D" to give a clear serum was 0.038% based on the latex. The amount of lauric acid esterified with triethanol amine to give a clear serum was 0.077% based on the rubber.

In other runs where the same latex contained 0.2 and 0.4 part of sodium salt of the condensation product of formaldehyde and naphthalene sulfonic acid, the serums of the flocculates were cleared by the addition of 0.141% and 0.280%, respectively, of 5-dodecylbenzyl trimethyl ammonium chloride based on the rubber.

The following amines which are not cationic surface-active agents did not clear up the serum on addition to the flocculated latex: monoethanolamine, diethanolamine, triethanolamine, di-n-amylamine, aniline, o-phenyl aniline.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. The method of coagulating a butadiene polymer synthetic rubber latex containing up to 100 parts of carbon black per 100 parts of synthetic rubber content and containing an anionic surface-active dispersing agent of the general formula R—SO$_3$M where M represents an alkali radical and R represents an organic radical containing at least one group having more than 8 carbon atoms, which comprises flocculating the latex by means of water-soluble material of the group consisting of acids, polyvalent metal salts, acids and polyvalent metal salts, and acids and alkali salts, and in addition a cationic surface-active agent containing an organic group having 10 to 20 carbon atoms.

2. The method of coagulating a butadiene polymer synthetic rubber latex containing up to 100 parts of carbon black per 100 parts of synthetic rubber content and containing an anionic surface-active dispersing agent of the general formula R—SO$_3$M where M represents an alkali radical and R represents an organic radical containing at least one group having more than 8 carbon atoms, which comprises flocculating the latex by means of sodium chloride, sulfuric acid, and a cationic surface-active agent containing an organic group having 10 to 20 carbon atoms.

3. The method of coagulating a synthetic rubber latex comprising an aqueous emulsion polymerizate of a mixture of a butadiene-1,3 and a compound which contains a single CH$_2$=C< group and is copolymerizable with butadienes-1,3, said latex containing an anionic surface-active dispersing agent of the general formula R—SO$_3$M where M represents an alkali radical and R represents an organic radical containing at least one group having more than 8 carbon atoms, which comprises flocculating the latex by means of water-soluble material of the group consisting of acids, polyvalent metal salts, acids and polyvalent metal salts, and acids and alkali salts, and in addition a cationic surface-active agent containing an organic group having 10 to 20 carbon atoms.

4. The method of coagulating a synthetic rubber latex comprising an aqueous emulsion polymerizate of a mixture of a butadiene-1,3 and a compound which contains a single CH$_2$=C< group and is copolymerizable with butadienes-1,3, said latex containing an anionic surface-active dispersing agent of the general formula R—SO$_3$M where M represents an alkali radical and R represents an organic radical containing at least one group having more than 8 carbon atoms, which comprises flocculating the latex by means of sodium chloride, sulfuric acid, and a cationic surface-active agent containing an organic group having 10 to 20 carbon atoms.

5. The method of coagulating a synthetic rubber latex comprising an aqueous emulsion polymerizate of a mixture of butadiene-1,3 and styrene, said latex containing up to 100 parts of carbon black per 100 parts of synthetic rubber content and containing an anionic surface-active dispersing agent of the general formula R—SO$_3$M where M represents an alkali radical and R represents an organic radical containing at least one group having more than 8 carbon atoms, which comprises flocculating the latex by means of water-soluble material of the group consisting of acids, polyvalent metal salts, acids and polyvalent metal salts, and acids and alkali salts, and in addition a cationic surface-active agent containing an organic group having 10 to 20 carbon atoms.

6. The method of coagulating a synthetic rubber latex comprising an aqueous emulsion polymerizate of a mixture of butadiene-1,3 and styrene, said latex containing up to 100 parts of carbon black per 100 parts of synthetic rubber content and containing an anionic surface-active dispersing agent of the general formula R—SO$_3$M where M represents an alkali radical and R represents an organic radical containing at least one group having more than 8 carbon atoms, which comprises flocculating the latex by means of sodium chloride, sulfuric acid, and a cationic surface-active agent containing an organic group having 10 to 20 carbon atoms.

JAMES W. ADAMS.

No references cited.